C. H. WORSEY.
STRAINER FOR LUBRICATING SYSTEMS.
APPLICATION FILED DEC. 18, 1906.
922,657.
Patented May 25, 1909.
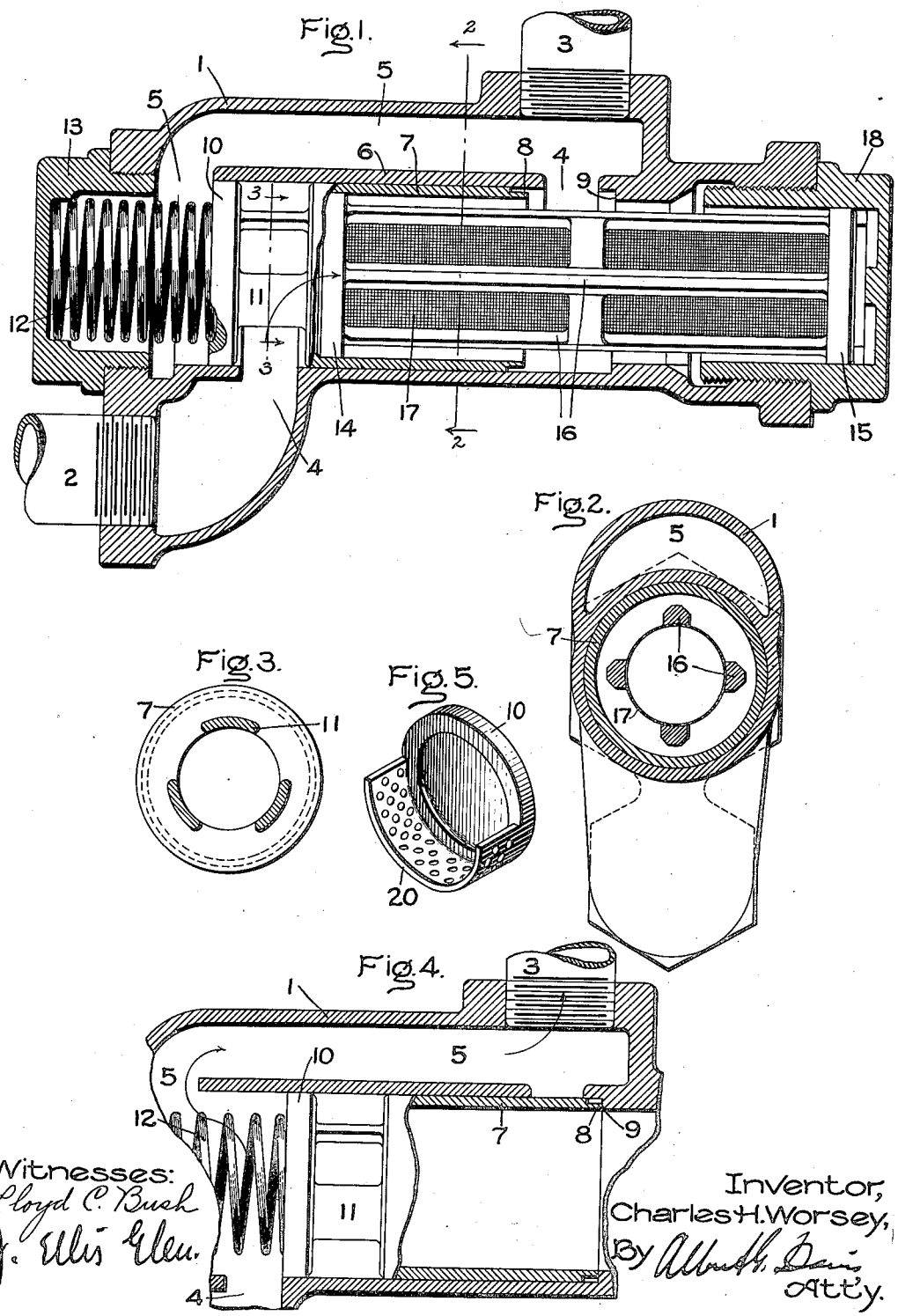
Witnesses:
Lloyd C. Bush
J. Ellis Glen
Inventor,
Charles H. Worsey,
By Albert H. Davis
Att'y.

UNITED STATES PATENT OFFICE.

CHARLES H. WORSEY, OF LYNN, MASSACHUSETTS, ASSIGNOR TO GENERAL ELECTRIC COMPANY, A CORPORATION OF NEW YORK.

STRAINER FOR LUBRICATING SYSTEMS.

No. 922,657.  Specification of Letters Patent.  Patented May 25, 1909.

Application filed December 18, 1906. Serial No. 348,382.

*To all whom it may concern:*

Be it known that I, CHARLES H. WORSEY, a citizen of the United States, residing at Lynn, county of Essex, State of Massachusetts, have invented certain new and useful Improvements in Strainers for Lubricating Systems, of which the following is a specification.

In the operation of machinery it is necessary in many cases to employ lubricant under high pressure, and to provide means for insuring a continuous flow thereof to the bearing or bearings. In such a system it is necessary to provide one or more strainers to prevent grit, metal chips and other foreign matter from passing into the pump or bearing or bearings and injuring them and the shafts contained therein.

My invention has for its object to provide a strainer of improved construction whereby the strainer proper can be removed, cleaned and reinserted in place without interrupting the flow of lubricant to the apparatus being lubricated.

In the accompanying drawing which illustrates one of the embodiments of my invention, Figure 1 is a longitudinal section of a strainer; Fig. 2 is a section taken on line 2 2, of Fig. 1; Fig. 3 is a section taken on line 3, 3, of Fig. 1; Fig. 4 is a view showing the device in operation with the strainer removed, and Fig. 5 is a perspective view showing a strainer adapted to be put in service when the main strainer is removed.

1 indicates a casing which is provided with an inlet pipe 2 and a discharge pipe 3. In the casing are two passages 4 and 5 arranged in multiple, the main passage 4 extending through the removable strainer, while the auxiliary passage extends around the strainer and is normally out of service. Formed within the casing is an open-ended cylinder 6 containing a tubular member 7 which has a valve 8 formed on its right hand end. The valve is cut away slightly at the end to prevent foreign particles from being wedged between it and the seat 9 when the valve is closed. The valve is normally open when the strainer is in operation and is closed when the strainer is removed for the purpose of cleaning or otherwise. The strainer may be connected to the suction or discharge side of the pump. When on the discharge side the valve 8, when closed, will prevent liquid from flowing out of the casing, and when on the suction side it will prevent the entrance of air which would destroy the vacuum. On the left hand end of the tubular member is a piston valve 10 connected thereto by columns 11. The function of this piston valve is to prevent the passage of lubricant from the inlet 2 to the auxiliary passage 5 during the normal operation of the device and to shut off the flow of lubricant through the main passage 4 when the strainer is removed and to admit it to the auxiliary passage 5. A spring 12 constantly urges the valves 8 and 10 toward the right at all times and is seated in a removable screwthreaded plug 13. By changing the position of the plug the tension on the spring can be varied.

Located within the tubular member 7 is a frame or cage for the strainer comprising heads 14 and 15 connected by longitudinally extending bars 16. The heads are of such diameter that the cage is held centrally in position, as shown in section, Fig. 2. Located within the cage is a tubular screen 17 for separating foreign matter from the lubricating fluid as it flows through the passage 4 to the discharge pipe 3. The right hand end of the cage is supported by a screw threaded plug 18. It is to be observed that between the bore of this plug and the cage, and between the bore of the member 7 and the cage, sufficient space is provided to permit the lubricant to freely flow therethrough. It will thus be seen that a screen of large dimensions is provided to insure good operation of the strainer even though the inside of the strainer itself contains a considerable mass of foreign matter separated from the lubricant. This arrangement also results in a comparatively low velocity of the fluid as it flows through the mesh of the strainer. It is to be noted that the screw thread on the plug 18 is made longer than the travel of the valves 8 or 10, the object being to enable the strainer proper to be removed without interrupting the flow of the lubricant from the inlet 2 to the outlet 3.

As the plug 18 is backed out the cage follows it and also the piston valve 10, since the spring 12 continually urges them toward the right. This results in the valve 8 interrupting the continuity of the passage 4, as shown in Fig. 4. At or about the time the valve 8 closes, the piston valve 10, carried by the tubular member 7, passes from one of its seats to the other and cuts off the flow of lubricant through the passage 4 and opens the auxiliary 5 and permits lubricant to flow directly from the inlet 2 to the discharge 3. From this it will be seen that a direct passage for the lubricant is provided from the inlet end of passage 4 to the inlet end of the passage 5, thence to the outlet 3, which passage is cut off from that within the cylinder 6. The plug can then be completely unscrewed and the strainer removed and cleaned without interrupting the flow of lubricant to the bearing or bearings.

As the strainer and its cage are open at one end it is a very simple matter to clean and reinsert it in position, or a new cage and strainer may be inserted in place, as desired. After the cage is inserted in place, the plug 18 is inserted and as it is screwed into place, it will engage with the right hand end of the cage and gradually push it to the left, at the same time opening the valve 8 and closing the valve 10, so that the auxiliary passage is closed and all of the lubricant will pass through the strainer.

From the foregoing, it will be seen that two paths are provided for the lubricant, one of which contains a strainer and is normally in operation, while the other is in shunt to the first and is only in service when the main path is closed. Since the opening and closing of these valves is dependent upon the insertion and the removal of the plug 18, it follows that there is no danger of interrupting the lubricant supply to the apparatus being served owing to carelessness on the part of the attendant, as would be the case if hand valves were provided and it was necessary to operate one or more for removing the strainer and to restore them to their normal position after the strainer is restored to place. In addition to this the construction is very simple, requires few parts and is inexpensive to manufacture. It is to be noted that the bore of the cylinder 6 is in line with the plugs 13 and 18 which makes it a simple matter to machine. The tubular member and valves are removed through the opening at the left, and the strainer through the opening at the right.

In Fig. 5 is shown a modification wherein an auxiliary strainer 20 is mounted on the piston valve 10 and so arranged that when the main strainer is removed it will be interposed between the inlet and outlet and thus prevent the passage of foreign particles to the pump or bearings, as the case may be. I may use the strainer 20 or not as best meets the requirements for which the device as a whole is intended.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States is,—

1. In a device of the character described, the combination of a casing having main and auxiliary passages therein, a strainer located in the main passage, and means brought into action by the removal of the strainer for cutting the main passage out of and the auxiliary passage into service when said strainer is removed.

2. In a device of the character described, the combination of a casing having passages for lubricant therein, strainers for the passages, there being openings in the walls of the casing for inserting and removing the strainers, devices for opening and closing said openings, and means that is automatically brought into action during the opening of a passage by one of said devices for the removal of one of the strainers, which means shuts off said passage and thereby prevents escape of lubricant through it from interfering with the flow of lubricant through the casing.

3. In a device of the character described, the combination of a casing having main and auxiliary passages therein, a strainer located in the main passage, a strainer for the auxiliary passage, and means normally having a tendency to act to cut the main passage and strainer out of service and the auxiliary passage and strainer into service, which means is brought into action upon the removal of the main strainer and is reset by its insertion.

4. In a device of the character described, the combination of a chambered casing having an inlet, an outlet and a strainer receiving opening, a strainer which is inserted in the casing through the opening, a removable cover for the opening to permit the insertion and removal of the strainer, and a means brought into action by the removal of the cover for preventing fluid from escaping from the casing when said cover is removed.

5. In a device of the character described, the combination of a casing having main and auxiliary passages, an inlet and an outlet, and an opening through which the strainer is inserted and removed, a strainer located in the main passage through which the fluid normally flows, a cover for the opening in said casing, and a valve which automatically closes when the cover is opened and causes the passage of fluid to be directed from the main to the auxiliary passage.

6. In a device of the character described, the combination of a casing having an inlet and an outlet, passages arranged in multiple between the inlet and the outlet, a strainer in the main passage through which the fluid normally flows, there being a covered opening through which the strainer is inserted and removed, and a valve means for automatically cutting the main passage out and the auxiliary passage into service and preventing the escape of fluid when the cover is removed.

7. In a device of the character described, the combination of a casing having an inlet, an outlet and a strainer receiving opening, passages within the casing, a tubular piston which acts as a valve when the strainer is removed to prevent the escape of fluid, a second piston carried by the first which acts as a valve to cut one passage into service and another out, a strainer located in the tubular piston, a screw threaded cover for the opening in the casing, and means acting as the cover is unscrewed to actuate the valves before the strainer can be removed.

8. In a device of the character described, the combination of a casing having an inlet, an outlet, a cylinder and a strainer receiving opening, a piston mounted in the cylinder, valves carried thereby, a strainer mounted in the casing, a spring which urges the valves toward a closed position, there being main and auxiliary passages controlled thereby, and a screw threaded cover for the opening, the threaded portion of said cover having a greater length than the travel of the valves.

9. In a device of the character described, the combination of a casing having an inlet, an outlet, a cylinder and a strainer receiving opening, a piston mounted in the cylinder, valves carried thereby, a strainer comprising a cage and a wire mesh mounted in said cylinder and entering the tubular piston, a spring which urges the valves in a given direction, a screw threaded means for adjusting the tension of the spring, there being main and auxiliary passages controlled by the valves, and a tubular cover which contains one end of the strainer and has a screw-threaded portion coöperating with the casing that has a length greater than the movements of the valves.

10. In a device of the character described, the combination of a casing, a valve which normally has a tendency to close and is provided with a cut-away portion to prevent foreign matter from being caught between it and the seat, and a strainer normally holding the valve open and which permits the valve to close when it is removed.

In witness whereof, I have hereunto set my hand this fifteenth day of December, 1906.

CHARLES H. WORSEY.

Witnesses:
 JOHN A. McMANUS, Jr.,
 HENRY C. SPINNEY.